United States Patent
Sarkisian et al.

(10) Patent No.: US 8,114,923 B2
(45) Date of Patent: Feb. 14, 2012

(54) INKJET INK SOLVENT SYSTEM

(75) Inventors: George M. Sarkisian, San Diego, CA (US); Phillip C. Cagle, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1244 days.

(21) Appl. No.: 11/390,778

(22) Filed: Mar. 27, 2006

(65) Prior Publication Data

US 2007/0225401 A1 Sep. 27, 2007

(51) Int. Cl.
*C09D 11/10* (2006.01)
(52) U.S. Cl. ......... 523/160; 524/502; 427/466; 427/469
(58) Field of Classification Search .............. 106/31.13, 106/218; 523/160; 524/366; 347/1, 54, 347/56, 68, 73, 100, 112
See application file for complete search history.

(56) References Cited

U.S. PATENT DOCUMENTS

| | | | | |
|---|---|---|---|---|
| 5,958,121 A * | 9/1999 | Lin | ........................... | 106/31.43 |
| 6,251,175 B1 * | 6/2001 | Zhu et al. | .................. | 106/31.58 |
| 6,444,017 B1 * | 9/2002 | Yue et al. | .................. | 106/31.28 |
| 6,548,571 B1 | 4/2003 | Cheng et al. | | |
| 6,648,951 B2 * | 11/2003 | Chen et al. | .................. | 106/31.47 |
| 6,716,949 B2 * | 4/2004 | Ganapathiappan | ........ | 526/317.1 |
| 6,800,673 B2 | 10/2004 | Yamanouchi et al. | | |
| 6,835,240 B2 | 12/2004 | Nishita et al. | | |
| 6,855,195 B2 | 2/2005 | Nishita et al. | | |
| 6,890,378 B2 | 5/2005 | Yatake et al. | | |
| 6,908,185 B2 * | 6/2005 | Chen et al. | ...................... | 347/96 |
| 7,354,476 B2 * | 4/2008 | Beach et al. | ................. | 106/31.6 |
| 2004/0030001 A1 * | 2/2004 | Ma et al. | ........................ | 523/160 |
| 2004/0252169 A1 * | 12/2004 | Chen et al. | ...................... | 347/96 |
| 2005/0137282 A1 * | 6/2005 | Cagle et al. | ................... | 523/160 |

FOREIGN PATENT DOCUMENTS

| | | |
|---|---|---|
| EP | 1 319 519 A2 | 6/2003 |
| EP | 1 561 788 A | 8/2005 |
| EP | 1 650 272 A | 4/2006 |
| GB | 2 105 735 A | 3/1983 |

\* cited by examiner

*Primary Examiner* — David W Wu
*Assistant Examiner* — Vu A Nguyen

(57) ABSTRACT

A smear resistant inkjet ink formulation includes ink includes between 0.1 and 6% colorant, between 1 and 40% solvent, between 0.3 and 10% latex binder having a particle size between 100 and 300 nm and a glass transition temperature between −20 and +100 degrees Celsius, water, and between 0.1 and 4% hydrophobic styrene-acrylic or acrylic resin having an acid number between 50 and 250 and a molecular weight between 1,000 and 60,000 or a polyurethane resin having an acid number between 40 and 200 and a molecular weight between 3,000 and 400,000.

20 Claims, 1 Drawing Sheet

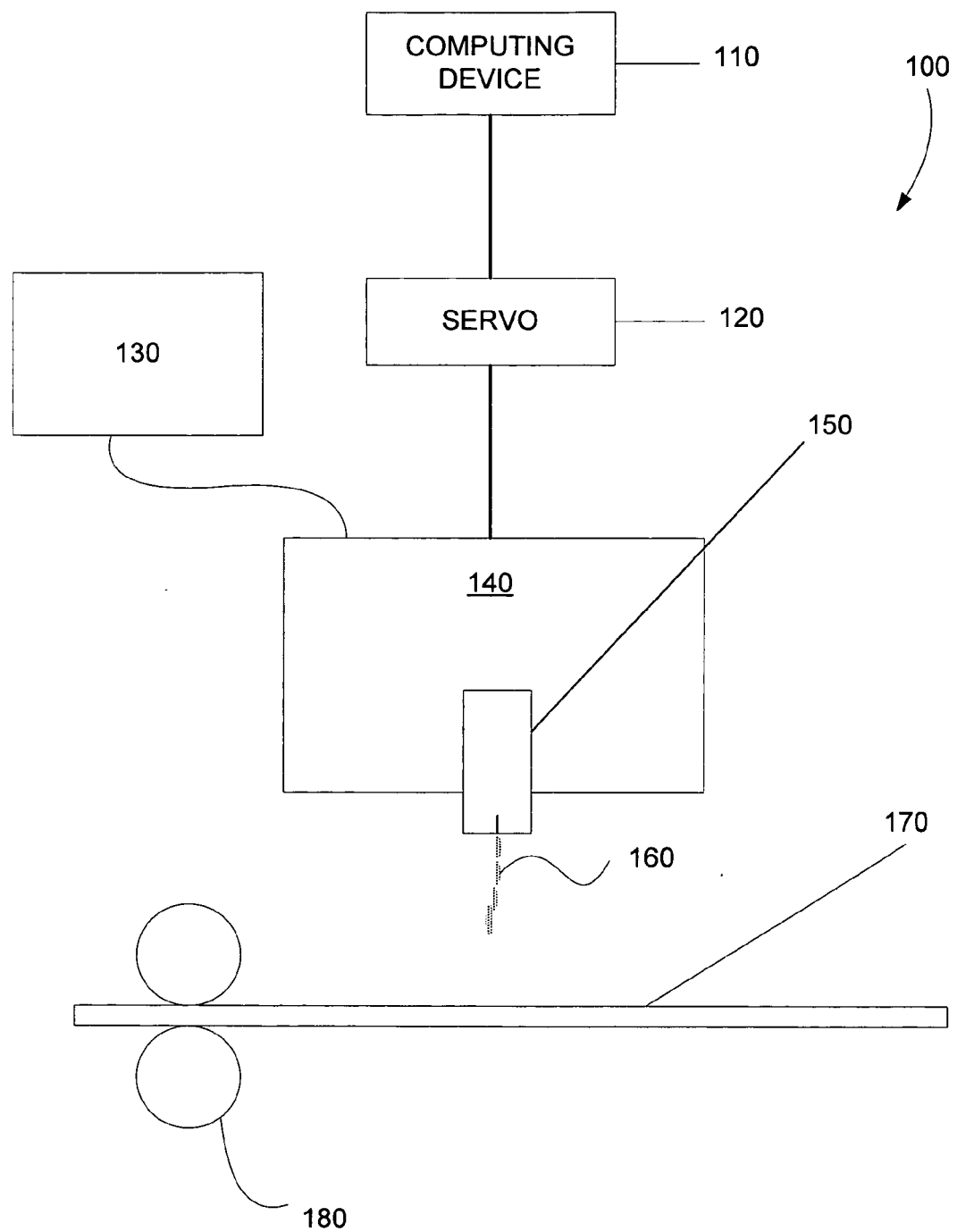

INKJET INK SOLVENT SYSTEM

BACKGROUND

Inkjet printing has become a popular way of recording images on various media surfaces, particularly paper, for a number of reasons, including, low printer noise, capability of high-speed recording, and multi-color recording. Additionally, these advantages of inkjet printing can be obtained at a relatively low price to consumers. Though there has been great improvement in inkjet printing, improvements are followed by increased demands from consumers for higher speeds, higher resolution, full color image formation, increased stability, and the like.

With respect to inkjet ink chemistry, the majority of commercial inkjet inks are water-based. Thus, their constituents are generally water-soluble (as in the case with many dyes) or water dispersible (as in the case with many pigments). Because of their water-based nature, inkjet ink systems, in general, tend to exhibit poorer image fade and durability when exposed to water or high humidity compared to other photographic or printing methods.

There have been great improvements in the area of water durability of inkjet inks through incorporation of certain inkjet compatible polymer colloids. However, many inkjet inks still deliver less than desirable optical density, durability, and/or wet smudge in response to highlighters. Particularly, alkaline highlighters are particularly damaging to traditional printed images because the alkaline highlighter ink may dissolve the inkjet inks containing base-solubilized binders.

SUMMARY

In one aspect of the present system and method, a smear resistant inkjet ink formulation includes ink includes between 0.1 and 6% colorant, between 1 and 40% solvent, between 0.3 and 10% latex binder having a particle size between 100 and 300 nm and a glass transition temperature between −20 and +100 degrees Celsius, water, and between 0.1 and 4% hydrophobic styrene-acrylic or acrylic resin having an acid number between 50 and 250 and a molecular weight between 1,000 and 60,000 or a polyurethane resin having an acid number between 40 and 200 and a molecular weight between 3,000 and 400,000.

BRIEF DESCRIPTION OF THE DRAWINGS

The accompanying drawing illustrates various embodiments of the present system and method and is a part of the specification. The illustrated embodiment is merely an example of the present system and method and does not limit the scope thereof.

FIG. 1 is a simple block diagram illustrating an inkjet material dispensing system, according to one exemplary embodiment.

Throughout the drawing, identical reference numbers designate similar, but not necessarily identical, elements.

DETAILED DESCRIPTION

Before particular embodiments of the present system and method are disclosed and described, it is to be understood that the present system and method are not limited to the particular process and materials disclosed herein as such may vary to some degree. It is also to be understood that the terminology used herein is used for the purpose of describing particular embodiments only and is not intended to be limiting, as the scope of the present system and method will be defined only by the appended claims and equivalents thereof.

In the present specification, and in the appended claims, the following terminology will be used:

The term "decap" is a measure of how long a nozzle may remain inactive before plugging. Similarly, the term "decap spits" shall be defined as a number of inkjet architecture firings that are required to re-establish proper drop ejection after plugging due to inactivity.

The term "2 Pass HL" is meant to be understood as the amount of ink transfer [in optical density (OD) units] that occurs when a ⅛" wide printed line is rubbed twice with a Sanford Major Accent Fluorescent Yellow highlighter.

The singular forms "a," "an," and "the" include plural referents unless the context clearly dictates otherwise. Thus, for example, reference to "a pigment" includes reference to one or more of such materials.

The terms "about" and "approximately," when referring to a numerical value or range is intended to encompass the values resulting from experimental error that can occur when taking measurements.

As used herein, "liquid vehicle" is defined to include liquid compositions that can be used to carry colorants, including pigments, to a substrate. Liquid vehicles are well known in the art, and a wide variety of liquid vehicle components may be used in accordance with embodiments of the present system and method. Such liquid vehicles may include a mixture of a variety of different agents, including without limitation, surfactants, co-solvents, buffers, biocides, viscosity modifiers, sequestering agents, stabilizing agents, and water. Though not liquid per se, the liquid vehicle can also carry other solids, such as polymers, UV curable materials, plasticizers, salts, etc.

As used herein "colorant" can include dyes, pigments, dye/pigment blends, and/or other particulates that may be suspended or dissolved in an ink vehicle. Dyes are typically water soluble, and therefore, can be desirable for use in many embodiments. However, pigments can also be used in other embodiments. Pigments that can be used include self-dispersed pigments and non self-dispersed dispersed pigments. Self-dispersed pigments include those that have been chemically surface modified with a charge or a polymeric grouping. This chemical modification aids the pigment in becoming and/or substantially remaining dispersed in a liquid vehicle. The pigment can also be a non self-dispersed pigment that utilizes a separate and unattached dispersing agent (which can be a polymer, an oligomer, or a surfactant, for example) in the liquid vehicle or physically coated on the surface of the pigment.

The term "latex" or "latex dispersion" includes both latex particulates as well as the aqueous medium in which the latex particulates are dispersed. More specifically, a latex is a liquid suspension comprising a liquid (such as water and/or other liquids) and polymeric particulates from 20 nm to 500 nm (preferably from 100 nm to 300 nm) in size. Typically, the polymeric particulate can be present in the liquid at from 0.3 wt % to 10 wt %. Such polymeric particulates can comprise a plurality of monomers that are typically randomly polymerized, and can also be crosslinked. Additionally, in one embodiment, the latex component can have a glass transition temperature from about −20° C. to +100° C.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of approximately 1 wt % to approximately 20 wt % should be interpreted to include not only the explicitly recited concentration limits of 1 wt % to approximately 20 wt %, but also to include individual concentrations such as 2 wt %, 3 wt %, 4 wt %, and sub-ranges such as 5 wt % to 10 wt %, 10 wt % to 20 wt %, etc.

In the following description, for purposes of explanation, numerous specific details are set forth in order to provide a thorough understanding of the present system and method for producing and using a solvent system for durable latex and binder mixtures. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

FIG. 1 illustrates an exemplary system (100) that may be used to apply an inkjet ink (160) to an ink receiving medium (170) according to one exemplary embodiment. As shown in FIG. 1, the present system includes a computing device (110) controllably coupled through a servo mechanism (120) to a moveable carriage (140) having an inkjet dispenser (150) disposed thereon. A material reservoir (130) is also coupled to the moveable carriage (140), and consequently to the inkjet print head (150). A number of rollers (180) are located adjacent to the inkjet dispenser (150) configured to selectively position an ink receiving medium (170). While the present exemplary system (100) is described in the context of applying an inkjet ink (160) onto an ink receiving medium (170), the present system and method may be used to mark any number of items with the present inkjet ink. The above-mentioned components of the present exemplary system (100) will now be described in further detail below.

The computing device (110) that is controllably coupled to the servo mechanism (120), as shown in FIG. 1, controls the selective deposition of an inkjet ink (160) on an ink receiving medium (170). A representation of a desired image or text may be formed using a program hosted by the computing device (110). That representation may then be converted into servo instructions that are housed in a processor readable medium (not shown). When accessed by the computing device (110), the instructions housed in the processor readable medium may be used to control the servo mechanisms (120) as well as the movable carriage (140) and inkjet dispenser (150). The computing device (110) illustrated in FIG. 1 may be, but is in no way limited to, a workstation, a personal computer, a laptop, a personal digital assistant (PDA), or any other processor containing device.

The moveable carriage (140) of the present printing system (100) illustrated in FIG. 1 is a moveable material dispenser that may include any number of inkjet material dispensers (150) configured to dispense the present inkjet ink (160). The moveable carriage (140) may be controlled by a computing device (110) and may be controllably moved by, for example, a shaft system, a belt system, a chain system, etc. making up the servo mechanism (120). As the moveable carriage (140) operates, the computing device (110) may inform a user of operating conditions as well as provide the user with a user interface.

As an image or text is printed on an ink receiving medium (170), the computing device (110) may controllably position the moveable carriage (140) and direct one or more of the inkjet dispensers (150) to selectively dispense an inkjet ink at predetermined locations on ink receiving medium (170) as digitally addressed drops, thereby forming the desired image or text. The inkjet material dispensers (150) used by the present printing system (100) may be any type of inkjet dispenser configured to perform the present method including, but in no way limited to, thermally actuated inkjet dispensers, mechanically actuated inkjet dispensers, electrostatically actuated inkjet dispensers, magnetically actuated dispensers, piezoelectrically actuated dispensers, continuous inkjet dispensers, etc.

The material reservoir (130) that is fluidly coupled to the inkjet material dispenser (150) houses the present inkjet ink (160) prior to printing. The material reservoir may be any one or more container(s) configured to hermetically seal the inkjet ink (160) prior to printing and may be constructed of any number of materials including, but in no way limited to metals, plastics, composites, or ceramics. As illustrated in FIG. 1, the material reservoir(s) (130) may be separate from, yet fluidly coupled to the inkjet material dispenser (150). Alternatively, the material reservoir(s) (130) may be directly coupled to and form a part of the inkjet material dispenser (150).

FIG. 1 also illustrates the components of the present system that facilitate reception of the inkjet ink (160) onto the ink receiving medium (170). As shown in FIG. 1, a number of positioning rollers (180) may transport and/or positionally secure an ink receiving medium (170) during a printing operation. Alternatively, any number of belts, rollers, substrates, or other transport devices may be used to transport and/or positionally secure the ink receiving medium (170) during a printing operation, as is well known in the art. Additionally, any number of heated pick-up rollers (not shown), hot air fans (not shown), or radiation devices (not shown) may be used to apply thermal energy to fix an image on an ink receiving medium.

Inkjet inks have traditionally been formulated with any number of organic polymers to provide improvements to highlight smear. These polymers were typically water soluble or colloidal styrene-acrylics, acrylics, polyurethanes, and polyesters. However, the hydrophobic nature of the binders traditionally used for good highlighter smear has made the reliability and stability of these inkjet inks problematic.

Consequently, the present exemplary anionic ink system provides near laser durability for highlighter smear and wet smudge on office paper, while maintaining high stability in solution. The formation and composition of the present anionic inkjet ink (160) will now be described in detail below.

Exemplary Composition

In accordance with the present system and method, a system for printing images on a substrate can include an inkjet ink (160) and a printhead or other material dispenser (150) loaded with the inkjet ink. According to one exemplary embodiment, the present inkjet ink can include an anionic ink system and a cationic fixer fluid. More specifically, according to one exemplary embodiment, the present exemplary inkjet ink includes an anionic ink including a colorant, such as a dye or a pigment; a solvent system containing 2-pyrrolidinone and 1,2-hexanediol; water; and any number of binders including, but in no way limited to a combination of hydrophobic styrene-acrylic or acrylic resin and/or a polyurethane resin and a latex binder. According to one exemplary embodiment, described below, the styrene-acrylic resin has an acid number between approximately 50 and 250 and a molecular weight between approximately 1000 and 60,000. When a polyurethane resin is incorporated, it may have an acid number between 40 and 200, and a molecular weight between 3000 and 400,000. Further, the latex binder component of the exemplary binder combination has a particle size of between approximately 100 and 300 nm and a glass transition temperature of −20 to +100 degrees C. Additionally, according to one exemplary embodiment, the present inkjet ink system may include a cationic fixer fluid configured to fix the ink on a desired substrate. According to one exemplary embodiment, the cationic fixer includes, but is in no way limited to, a crashing agent such as an acid, metal salt or a cationic polymer. In addition to the above-mentioned components, the present exemplary inkjet ink composition may include any number of surfactants, buffering agents, biocides, sequestering agents, viscosity modifiers, humectants, stabilizing agents, and/or other known additives. Further details of each of the above-mentioned inkjet ink components will be provided below.

Hydrophobic Styrene-Acrylic

As mentioned above, the present exemplary inkjet ink system includes a hydrophobic styrene-acrylic or acrylic binder with an acid number between 50 and 250 and a molecular weight between approximately 1000 and 60,000. According to one exemplary embodiment, the styrene-acrylic or acrylic binder may include, but is in no way limited to styrene-acrylic or acrylic binders sold under the name Acronal by BASF having an acid number below approximately 220, Johnson Polymer's Joncryl 678 acrylic resin which has an acid number of 215, and/or acrylic binder emulsions such as Johnson Polymer's DFC 3030 or Johnson Polymer's Joncryl 624 acrylic emulsions which have acid numbers of 64 and 50, respectively. Additionally, styrene-acrylic resins such as Joncryl 586, as well as other Joncryls or SMA resins could be used.

Polyurethane (PU) Resin

When polyurethane resin is used in combination with the latex binder, the polyurethane resin may have an acid number between 40 and 200, and a molecular weight between 3000 and 400,000. Specifically, according to one exemplary embodiment, the polyurethane resin may include, but is in no way limited to, commercially available polyurethane resins such as Avecia PU resin; Alberdingk-Boley PU resin's U520, U712, U910, and U40; BASF PU resin Luviset P.U.R; and Crompton PU resins Witcobond W-232 and W-236.

Latex Binder

In addition to the above-mentioned styrene-acrylic or acrylic binder, the present exemplary inkjet ink system includes latex binder with a particle size ranging from approximately 100 to 300 nanometers and a glass transition temperature ranging from approximately −20 to +100 degrees C.

According to one exemplary embodiment, the latex binder component of the present exemplary inkjet ink includes a number of polymer particulates in the form of a latex dispersion. The inclusion of the latex may increase durability of a subsequently formed image.

According to one exemplary embodiment, the latex particulates included in the present inkjet ink may include latex particulates having surface acid groups. Specifically, latex particulates having surface acid groups tend to be more stable over longer periods of time, and tend to resist aggregation. Thus, in one exemplary embodiment, neutralized surface acid groups can be present on the latex particulates. These acid groups can be present throughout the latex particulates, including on the surfaces, or can be more concentrated at the surfaces. In a more detailed aspect, the latex particulates can be prepared using acid monomers copolymerized with other monomers to form the latex polymer. The acid functionalities are neutralized to provide a surface charge on the latex particles. In this exemplary embodiment, the acid monomers can be present at from approximately 0.5 wt % to 10 wt % of total monomers used to form the latex polymers. Typical acids that have been used to acidify the surface of latex particulates include carboxyl acids, though stronger acids can also be used. Carboxylic acids are weak acids that have been fairly effective for use in latex/inkjet ink systems. For example, methacrylic acid-functionalized latex particulates can be formed using approximately 6 wt % methacrylic acid.

In another exemplary embodiment, the latex particulates can be provided by multiple monomers copolymerized to form the latex particulates, wherein the multiple monomers include at least one crosslinking monomer present at from approximately 0.1 wt % to 3 wt % of total monomers used to form the latex particulates. Such a crosslinking monomer does not provide the acid groups but can provide other properties to the latex that can be desirable for inkjet applications.

A specific example of latex particulates that can be used include those prepared using an emulsion monomer mix of various weight ratios of styrene, hexyl methacrylate, ethylene glycol dimethacrylate, and methacrylic acid, which are copolymerized to form the latex. Typically, the styrene and the hexyl methacrylate monomers can provide the bulk of the latex particulate, and the ethylene glycol dimethacrylate and methyl methacrylate can be copolymerized therewith in smaller amounts. According to this exemplary embodiment, the acid group is provided by the methacrylic acid. While the present latex particulate example is provided, other combinations of monomers can similarly be used to form latex particulates. Exemplary monomers that can be used to form latex particulates according to the present exemplary system and methods include, but are in no way limited to, styrenes, C1 to C8 alkyl methacrylates, C1 to C8 alkyl acrylates, ethylene glycol methacrylates and dimethacrylates, methacrylic acids, acrylic acids, and the like.

Other aspects of the latexes of the present exemplary system and method can include properties such as desirable glass transition temperature and particulate density. For example, in one exemplary embodiment, the polymer glass transition temperature of the latex particulates used in the present exemplary system and method can be in the range of approximately −20° C. to +100° C. for inks printed at room temperature. The glass transition temperature of the latex may contribute to a desired ink performance relative to thermal shear stability, decel, decap, particle settling, and co-solvent resistance.

Colorant

According to one exemplary embodiment, the present exemplary inkjet ink system includes between approximately 0.1 to 6% colorant by volume. Specifically, the present exemplary inkjet ink system may include a number of anionic dyes and/or pigments or dye/pigment blends.

Examples of suitable anionic dyes include a large number of water-soluble acid and direct dyes. Specific examples of anionic dyes include Direct Yellow 86, Acid Red 249, Direct Blue 199, Direct Black 168, Direct Yellow 132, Reactive Black 31, Direct Yellow 157, Reactive Yellow 37, Acid Yellow 23, Reactive Red 180, Acid Red 52, Acid Blue 9, Direct Blue 86, Reactive Red 4, Reactive Red 56, Acid Red 92, Reactive Red 31 the Pro-Jet series of dyes available from Avecia Ltd., including Pro-Jet Yellow I, Pro-Jet Magenta I, Pro-Jet Cyan I, Pro-Jet Black I, and Pro-Jet Yellow 1-G; Aminyl Brilliant Red F-B (Sumitomo Chemical Co.); the Duasyn line of "salt-free" dyes available from Hoechst, such as Duasyn Direct Black HEF-SF, Duasyn Black RL-SF, Duasyn Direct Yellow 6G-SF VP216 (, Duasyn Brilliant Yellow GL-SF VP220, Duasyn Acid Yellow XX-SF VP413, Duasyn Brilliant Red F3B-SF VP218, Duasyn Rhodamine B-SF VP353, Duasyn Direct Turquoise Blue FRL-SF VP368, and Duasyn Acid Blue AE-SF VP344; mixtures thereof; and the like. Further examples include Tricon Acid Red 52, Tricon Direct Red 227, and Tricon Acid Yellow 17 (Tricon Colors Incorporated), Bernacid Red 2BMN, Pontamine Brilliant Bond Blue A, BASF X-34, Pontamine, Food Black 2, Catodirect Turquoise FBL Supra Conc., Carolina Color and Chemical), Special Fast Turquoise 8GL Liquid, Mobay Chemical), Intrabond Liquid Turquoise GLL, Crompton and Knowles), Cibracron Brilliant Red 38-A, Aldrich Chemical), Drimarene Brilliant Red X-2B, Pylam, Inc.), Levafix Brilliant Red E-4B (Mobay Chemical), Levafix Brilliant Red E-6BA (Mobay Chemical), Pylam Certified D&C Red #28, Pylam), Direct Brill Pink B Ground Crude (Crompton & Knowles), Cartasol Yellow GTF Presscake (Sandoz, Inc.), Tartrazine Extra Conc. (FD&C Yellow #5, Acid Yellow 23, Sandoz, Inc.), Catodirect Yellow RL (Direct Yellow 86, Carolina Color and Chemical), Cartasol Yellow GTF Liquid Special 110 (Sandoz, Inc.), D&C Yellow #10 (Yellow 3, Tricon), Yellow Shade 16948 (Tricon), Basacid Black X34 (BASF), Carta Black 2GT (Sandoz, Inc.), Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Aizen Spilon Yellow C-GNH (Hodagaya Chemical Company), Spirit Fast Yellow 3G, Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI Americas), Morfast Black Conc A (Morton-Thiokol), Diazol Black RN Quad (ICI Americas), Orasol Blue GN (Ciba-Geigy), Savinyl Blue GLS (Sandoz, Inc.), Luxol Blue MBSN (Morton-Thiokol), Sevron Blue 5GMF (ICI Americas), and Basacid Blue 750 (BASF); Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, all available from Bayer; Procion Turquoise PA, Procion Turquoise HA, Procion Turquoise Ho5G, Procion Turquoise H-7G, Procion Red MX-5B, Procion Red H8B, Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, all available from ICI Americas; Cibacron Red F-B, Cibacron Black BG, Lanasol Black B, Lanasol Red 5B, Lanasol Red B, and Lanasol Yellow 46, all available from Ciba-Geigy; Baslien Black P-BR, Baslien Yellow EG, Baslien Brilliant Yellow P-3GN, Baslien Yellow M-6GD, Baslien Brilliant Red P-3B, Baslien Scarlet E-2G, Baslien Red E-B, Baslien Red E-7B, Baslien Red M-5B, Baslien Blue E-R, Baslien Brilliant Blue P-3R, Baslien Black P-BR, Baslien Turquoise Blue P-GR, Baslien Turquoise M-2G, Baslien Turquoise E-G, and Baslien Green E-6B, all available from BASF; Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, all available from Sumitomo Chemical Company; Intracron Yellow C-8G, Intracron Red C-8B, Intracron Turquoise Blue GE, Intracron Turquoise HA, and Intracron Black RL, all available from Crompton and Knowles, Dyes and Chemicals Division; Pro-Jet 485; Magenta 377; mixtures thereof; and the like. This list is intended to be merely exemplary, and should not be considered limiting.

Similarly, suitable pigments can be black pigments, white pigments, cyan pigments, magenta pigments, yellow pigments, or the like. Further, pigments can be organic or inorganic particles as is well known in the art. Suitable inorganic pigments include, for example, carbon black. However, other inorganic pigments may be suitable such as titanium oxide, cobalt blue ($CoO$—$Al_2O_3$), chrome yellow ($PbCrO_4$), and iron oxide. Suitable organic pigments include, for example, azo pigments including diazo pigments and monoazo pigments, polycyclic pigments (e.g., phthalocyanine pigments such as phthalocyanine blues and phthalocyanine greens, perylene pigments, perynone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitropigments, nitroso pigments, and the like. Representative examples of phthalocyanine blues include copper phthalocyanine blue and derivatives thereof (Pigment Blue 15). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 216 (Brominated Pyranthrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Violet 19, Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 151, Pigment Yellow 117, Pigment Yellow 128 and Pigment Yellow 138, Pigment Yellow 155, Pigment Yellow 83, and Pigment Yellow 213. Such pigments are commercially available in either powder or press cake form from a number of sources including, BASF Corporation, Engelhard Corporation and Sun Chemical Corporation.

Examples of black pigments that can be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods such as a channel method, a contact method, a furnace method, an acetylene method, or a thermal method, and are commercially available from such vendors as Cabot Corporation, Columbian Chemicals Company, Degussa AG, and E.I. DuPont de Nemours and Company. Suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, CAB-O-JET 200, CAB-O-JET 300, REGAL, BLACK PEARLS, ELFTEX, MOGUL, and VULCAN pigments; Columbian pigments such as RAVEN 7000, RAVEN 5750, RAVEN 5250, RAVEN 5000, and RAVEN 3500; Degussa pigments such as Color Black FW 200, RAVEN FW 2, RAVEN FW 2V, RAVEN FW 1, RAVEN FW 18, RAVEN S160, RAVEN FW S170, Special Black 6, Special Black 5, Special Black 4A, Special Black 4, PRINTEX U, PRINTEX 140U, PRINTEX V, and PRINTEX 140V; and TIPURE R-101 available from Dupont. The above list of pigments includes unmodified pigment particulates, small molecule attached pigment particulates, and polymer-dispersed pigment particulates.

Similarly, a wide variety of colored pigments can be used with the present system and method, therefore the following listing is not intended to be limiting. For example, colored pigments can be blue, brown, cyan, green, white, violet, magenta, red, orange, yellow, as well as mixtures thereof. The following color pigments are available from Cabot Corp.: CABO-JET 250C, CABO-JET 260M, and CABO-JET 270Y. The following color pigments are available from BASF Corp.: PALIOGEN Orange, PALIOGEN Orange 3040, PALIOGEN Blue L 6470, PALIOGEN Violet 5100, PALIOGEN Violet 5890, PALIOGEN Yellow 1520, PALIOGEN Yellow 1560, PALIOGEN Red 3871K, PALIOGEN Red 3340, HELIOGEN Blue L 6901F, HELIOGEN Blue NBD 7010, HELIOGEN Blue K 7090, HELIOGEN Blue L 7101F, HELIOGEN Blue L6900, L7020, HELIOGEN Blue D6840, HELIOGEN Blue D7080, HELIOGEN Green L8730, HELIOGEN Green K 8683, and HELIOGEN Green L 9140. The following pigments are available from Ciba-Geigy Corp.: CHROMOPHTAL Yellow 3G, CHROMOPHTAL Yellow GR, CHROMOPHTAL Yellow 8G, IGRAZIN Yellow 5GT, IGRALITE Rubine 4BL, IGRALITE Blue BCA, MONASTRAL Magenta, MONASTRAL Scarlet, MONASTRAL Violet R, MONASTRAL Red B, and MONASTRAL Violet Maroon B. The following pigments are available from Heubach Group: DALAMAR Yellow YT-858-D and HEUCOPHTHAL Blue G XBT-583D. The following pigments are available from Hoechst Specialty Chemicals: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, NOVOPERM Yellow HR, NOVOPERM Yellow FGL, Hansa Brilliant Yellow 10GX, Permanent Yellow G3R-01, HOSTAPERM Yellow H4G, HOSTAPERM Yellow H3G, HOSTAPERM Orange GR, HOSTAPERM Scarlet GO, HOSTAPERM Pink E, Permanent Rubine F6B, and the HOSTAFINE series. The following pigments are available from Mobay Corp.: QUINDO Magenta, INDOFAST Brilliant Scarlet, QUINDO Red R6700, QUINDO Red R6713, and INDOFAST Violet. The following pigments are available from Sun Chemical Corp.: L74-1357 Yellow, L75-1331 Yellow, and L75-2577 Yellow. Other examples of pigments can include Normandy Magenta RD-2400, Permanent Violet VT2645, Argyle Green XP-111-S, Brilliant Green Toner GR 0991, Sudan Blue OS, PV Fast Blue B2GO1, Sudan III, Sudan II, Sudan IV, Sudan Orange G, Sudan Orange 220, Ortho Orange OR 2673, Lithol Fast Yellow 0991K, Paliotol Yellow 1840, Lumogen Yellow D0790, Suco-Gelb L1250, Suco-Yellow D1355, Fanal Pink D4830, Cinquasia Magenta, Lithol Scarlet D3700, Toluidine Red, Scarlet for Thermoplast NSD PS PA, E. D. Toluidine Red, Lithol Rubine Toner, Lithol Scarlet 4440, Bon Red C, Royal Brilliant Red RD-8192, Oracet Pink RF, and Lithol Fast Scarlet L4300. These pigments are available from commercial sources such as Hoechst Celanese Corporation, Paul Uhlich, BASF, American Hoechst, Ciba-Geigy, Aldrich, DuPont, Ugine Kuhlman of Canada, Dominion Color Company, Magruder, and Matheson. Examples of other suitable colored pigments are described in the Colour Index, 3rd edition (The Society of Dyers and Colourists, 1982).

Other pigments not specifically listed can also be suitable for use with the present exemplary system. The above-illustrated pigments can be used singly or in combination of two or more, or in combination with anionic or nonionic dyes. Typically, the pigments of the present system and method can be from about 10 nm to about 10 µm and in one aspect can be from 10 nm to about 500 nm in diameter, although sizes outside this range can be used if the pigment can remain dispersed and provide adequate color properties. In one detailed aspect of the present system and method, the pigment can comprise from about 1% to about 6% by weight of the inkjet ink composition.

Additionally, according to one exemplary embodiment mentioned above, a polymer attached pigment such as a Cabot polymer attached pigment. According to this exemplary embodiment, the incorporation of a polymer attached pigment may reduce or even eliminate the need for use of a fixing agent or pre-processing of the desired substrate. According to one exemplary embodiment, the polymer attached pigment may include, but is in no way limited to, any pigment having a polymer attachment whereby the polymer is a styrene-acrylic resin with an acid number of 50 to 250 and a molecular weight of approximately 1,000 to 60,000.

Solvent

The present exemplary inkjet ink system also includes between approximately 1 and 40% solvents. According to one exemplary embodiment, the solvents primarily include 2-pyrrolidinone and 1,2-hexanediol, or other typically volatile solvents having a vapor pressure above approximately 0.01 mmHg at 25° C. These typically rapid solvents exhibit a generally rapid rate of evaporation, resulting in increased throughput and printing speed. While a majority of the above-mentioned solvent content comprises typically volatile solvents having a vapor pressure above approximately 0.01 mmHg at 25° C., a remainder of the solvent content may include solvents with vapor pressures lower than 0.01 mmHg at 25° C. including, but not limited to, ethoxylated glycerol (LEG-1).

In particular, the solvent can also include, but is not limited to ethoxylated glycerol; 2-methyl-1,3-propanediol; 2-methyl2,4-pentanediol; 1,5-pentanediol; 2-pyrrolidinone; 1-(2-hydroxyethyl)-2-pyrrolidinone; 2-ethyl-2-hydroxymethyl-1,3-propanediol; diethylene glycol; 3-methoxybutanol; and 1,3-dimethyl-2-imidazolidinone. The solvent can also include, but is not limited to, 1,2-hexanediol; 1,2-octanediol; 2,5-dimethyl-3-hexyne-2,5diol; trimethylol propane; 3-hexyne-2,5-diol; sulfolane; 3-pyridyl carbinol; and other pyridine derivatives. In addition, the solvents can impart desired characteristics to the present pigment-based ink. More particularly, the solvents can be added to reduce the rate of evaporation of water in the ink-jet to minimize clogging or other properties of the ink such as viscosity, pH, surface tension, optical density, and print quality.

Water

As mentioned above, the balance of the present exemplary inkjet ink system includes water.

In addition to water, the balance of the present exemplary inkjet ink system may also include any number of buffering agents and/or biocides. Any number of commonly known buffers may be used to establish a desired pH level in the inkjet ink system. Additionally, various biocides can be used to inhibit growth of undesirable microorganisms. Several examples of suitable biocides include, but are in no way limited to, benzoate salts, sorbate salts, commercial products such as NUOSEPT (ISP), UCARICIDE (Dow), VANCIDE (RT Vanderbilt Co.), and PROXEL (Avecia) and other known biocides. Typically, such biocides comprise less than about 5 wt % of the inkjet ink composition and often from about 0.05 wt % to about 2 wt %.

Cationic Fixing Fluid

As mentioned previously, a cationic fixing fluid may also be associated with the present exemplary inkjet ink system configured to fix the ink on a desired substrate. According to the present exemplary embodiment, the cationic fixing fluid may be a solution composition that comprises a liquid vehicle and a "crashing agent." According to one exemplary embodiment, the liquid vehicle combined with the crashing agent may be configured to be chemically stable, and can be configured for inkjet printing. The crashing agent can be a cationic polymer, a multivalent metal ion or ionic group, and/or an organic acid. The crashing agent is typically configured to precipitate with at least one compositional component of an associated inkjet ink (to be overprinted or underprinted on a substrate therewith). The compositional component that precipitates with the crashing agent can be an anionic dye or a polymer, for example.

According to one exemplary embodiment, the fixer composition can be stored separately from the inkjet ink, and the fluid dispensing system can be configured for overprinting or underprinting the fixer composition with respect to the inkjet ink. Further, the present exemplary inkjet ink and the cationic fixer fluid can be present in two separate inkjet pens, or alternatively, can be present in two separate reservoirs of a common inkjet pen. In yet another exemplary embodiment, the cationic fixer fluid may be applied to the desired substrate during a pre-treatment operation, wherein the entire desired substrate is coated with a cationic fixer fluid or other fixing element.

According to the present exemplary embodiment, the crashing agent included in the cationic fixing fluid may be any single chemical or combination of chemicals in a fixer composition that can facilitate the desolubilization or precipitation of one or more component(s) of an inkjet ink. Precipitation of the anionic dye can impact the waterfastness of the inkjet image. Precipitation of non-colorants, such as anionic surfactants, can provide advantages in bleed control. The desolubilizing can be accomplished by proton transfer from collision or close proximity of the crashing agent with the colorant and/or another inkjet ink component, or alternatively, the desolubilizing can be accomplished by component associations induced by the crashing agent and/or component associations occurring with the crashing agent. Other crashing or reaction mechanisms can also occur.

As mentioned, according to one exemplary embodiment, the crashing agent may be a cationic polymer, a multivalent ion or ionic group, or an acid, for example. Many possible crashing agents within these categories, or others, can be used to crash one or more components of the inkjet ink. For example, if the crashing agent is a cationic polymer, it can be one or more of polyvinylpyridines, polyalkylaminoethyl acrylates, polyalkylaminoethyl methacrylates, poly(vinyl imidazole), polyethyleneimines, polybiguamides, polyguanides, polyvinylamines, polyallylamines, polyacrylamines, polyacrylamides, polyquaternaryamines, cationic polyurethanes, aminocelluloses, and/or polysaccharide amines.

Alternatively, if the crashing agent includes a multivalent ion or ionic group, it can be provided by one or more of multivalent metal salts (such as aluminum nitrate, calcium chloride, and magnesium nitrate), EDTA salts, phosphonium halide salts, organic acids, and/or other monovalent salts.

Further, according to one exemplary embodiment, If the crashing agent is an acid, it can be provided by one or more of succinic acid, glycolic acid, citric acid, nitric acid, hydrochloric acid, phosphoric acid, sulfuric acid, polyacrylic acid, acetic acid, malonic acid, maleic acid, ascorbic acid, glutaric acid, fumaric acid, tartaric acid, lactic acid, nitrous acid, boric acid, carbonic acid, carboxylic acids such as formic acid, chloroacetic acid, dichloroacetic acid, trichloroacetic acid, fluoroacetic acid, trimethylacetic acid, methoxyacetic acid, mercaptoacetic acid, propionic acid, butyric acid, valeric acid, caprioc acid, caprylic acid, capric acid, lauric acid, myristic acid, palmitic acid, stearic acid, oleic acid, rinolic acid, rinoleic acid, cyclohexanecarboxylic acid, phenylaceticc acid, benzoic acid, o-toluic acid, m-toluic acid, p-toluic acid, o-chlorobenzoic acid, m-chlorobenzoic acid, p-chlorobenzoic acid, o-bromobenzoic acid, m-bromobenzoic acid, p-bromobenzoic acid, o-nitrobenzoic acid, m-nitrobenzoic acid, p-nitrobenzoic acid, oxalic acid, adipic acid, phthalic acid, isophthalic acid, terephthalic acid, salicylic acid, p-hydrobenzoic acid, anthranilic acid, m-aminobenzoic acid, p-aminobenzoic acid, benzenesulfonic acid, methylbenzenesulfonic acid, ethylbenzenesulfonic acid, dodecylbenzenesulfonic acid, 5-sulfosalicylic acid, 1-sulfonaphthalene, hexanesulfonic acid, octanesulfonic acid, dodecanesulfonic acid, amino acids such as glycine, alanine, valine, α-aminobutyric acid, α-aminobutryic acid, α-alanine, taurine, serine, α-amino-n-caprioc acid, leucine, norleucine, and/or phenylalanine.

When the above-mentioned anionic ink system is used in combination with the cationic fixer fluid, durability levels for highlighter smear and wet smudge on office paper is comparable with a typical durability level of a similar image printed with a traditional laser printed process. Particularly, as will be illustrated in the example below, the above-mentioned anionic ink system and cationic fixer fluid provide wet smudge and highlight smear of less than 60 mOD on office paper and less than 30 mOD on coated office paper. Further, when used with a black pigment, the optical density achieved is relatively high, in the 1.30 to 1.90 range. The present exemplary ink formulations also provide good nozzle health over a wide frequency range and are stable during storage.

EXAMPLE

The following example illustrates the embodiments of the system and method that are presently best known. However, it is to be understood that the following is only exemplary or illustrative of the application of the principles of the present system and method. Numerous modifications and alternative compositions, methods, and systems may be devised by those skilled in the art without departing from the spirit and scope of the present system and method. The appended claims are intended to cover such modifications and arrangements. Thus, while the present system and method has been described above with particularity, the following example provides further detail in connection with what is presently deemed to be the most practical and preferred embodiments of the present system and method.

A number of inkjet ink formulations in accordance with the present system and method, along with a more traditional control ink, were prepared using the components and ranges shown in Table 1. The components of each of the five formulations were combined to form inkjettable inks:

TABLE 1

| Ingredients | Formula A | Formula B | Formula C | Formula D | Formula E | Formula F |
| --- | --- | --- | --- | --- | --- | --- |
| Cabojet 200 pigment | 3.0 | 3.0 | 0.0 | 0.0 | 0.0 | 3.0 |
| Cabot Polymer- | 0.0 | 0.0 | 3.0 | 3.0 | 3.0 | 0.0 |

TABLE 1-continued

| Ingredients | Formula A | Formula B | Formula C | Formula D | Formula E | Formula F |
|---|---|---|---|---|---|---|
| attached pigment | | | | | | |
| Acrylic Latex A | 3.0 | 0.0 | 0.0 | 0.0 | 0.0 | 0.0 |
| Acrylic Latex B | 0.0 | 3.0 | 0.0 | 0.0 | 0.0 | 0.0 |
| Acrylic Latex C | 0.0 | 0.0 | 3.0 | 0.0 | 0.0 | 0.0 |
| Acrylic Latex D | 0.0 | 0.0 | 0.0 | 3.0 | 3.0 | 0.0 |
| Joncryl 586 resin | 0.6 | 0.6 | 0.6 | 0.0 | 0.0 | 1.8 |
| Avecia PU resin | 0.0 | 0.0 | 0.0 | 0.4 | 0.0 | 0.0 |
| Zonyl FSO surfactant | 0.03 | 0.03 | 0.03 | 0.03 | 0.03 | 0.03 |
| 2-Pyrrolidinone | 5.0 | 5.0 | 5.0 | 5.0 | 5.0 | 7.0 |
| 1,2-Hexanediol | 5.0 | 5.0 | 5.0 | 5.0 | 5.0 | 4.0 |
| LEG-1 | 3.0 | 3.0 | 3.0 | 3.0 | 3.0 | 0.0 |
| Water | balance | balance | balance | balance | balance | balance |

The above mentioned inkjet ink formulations were printed on both a standard sheet of office paper with a cationic fixer fluid underprinting, and on a coated gloss paper without the use of a fixer. Note that formula E is the latex control formulation and includes no resin. Additionally, formula F is a non-latex control formulation that includes Joncryl 586 resin. The results of the printing and subsequent print qualities are illustrated below in Table 2.

TABLE 2

| Formula | Paper, 4-Media Ave. KOD | 2pass HL | Coated Offset Lustro Gloss KOD | 2pass HL | Decap Spits to Recover 5 sec | 20 sec |
|---|---|---|---|---|---|---|
| A | 1.55 | 0.03 | 1.87 | 0.01 | 3 | 5 |
| B | 1.33 | 0.06 | 1.84 | 0.01 | 2 | 4 |
| C | 1.45 | 0.06 | 1.78 | 0.02 | 2 | 3 |
| D | 1.33 | 0.06 | 1.57 | 0.03 | 2 | 4 |
| E | 1.35 | 0.06 | 1.57 | 0.05 | 3 | 4 |
| F | 1.36 | 0.08 | 1.92 | 0.10 | 2 | 3 |

As illustrated in Table 2, the results attributed to Formulas A and B are representative of the same formulation using any number of colorant/pigment/dye systems. Similarly, Formulas C and D are representative of results that will be achieved for any number of polymer-attached pigments with J586 or PU resin. The results attributed to Formulas E and F demonstrate results that may be expected with traditional latex and non-latex formulations, respectively. As shown in Table 2, all of the inks tested exhibited acceptable decap performance. However, Formulas A through D generally exhibited improved smear performance on both standard paper and the gloss paper. Specifically, Formulas A-D exhibited between 2 and 10 times improved smear resistance when printed on coated offset Lustro Gloss media, compared to the more traditional control formulations.

The preceding description has been presented only to illustrate and describe exemplary embodiments of the present system and method. It is not intended to be exhaustive or to limit the system and method to any precise form disclosed. Many modifications and variations are possible in light of the above teaching. It is intended that the scope of the system and method be defined by the following claims.

What is claimed is:

1. A smear-resistant anionic jettable ink system comprising:
   between 0.1 and 6% colorant;
   between 1 and 40% solvent;
   between 0.3 and 10% latex binder having a particle size between 100 and 300 nm and a glass transition temperature between −20 and +100 degrees Celsius;
   water; and
   between 0.1 and 4% hydrophobic styrene-acrylic resin having an acid number between 50 and 250 and a molecular weight between 1,000 and 60,000.

2. The ink system of claim 1, wherein said solvents comprise a combination of 2-pyrrolidinone and 1,2-hexanediol.

3. The ink system of claim 1, wherein said colorant comprises a self-dispersed pigment.

4. The ink system of claim 3, wherein said self-dispersed pigment comprises additional styrene-acrylic or acrylic resin attached to said pigment.

5. The ink system of claim 4, wherein said styrene-acrylic or acrylic resin attached to said pigment has an acid number between 50 and 250 and a molecular weight between 1,000 and 60,000.

6. The ink system of claim 3, wherein said colorant comprises a polymer-attached pigment wherein said polymer-attached pigment is configured to securely adhere said ink system to a substrate without a cationic fixer fluid.

7. The ink system of claim 1, wherein said colorant comprises one of a dye, a pigment, or a pigment/dye blend.

8. The ink system of claim 1, further comprising a cationic fixer fluid used in association with said ink, wherein said cationic fixer fluid comprises a crashing agent.

9. The ink system of claim 8, wherein said crashing agent comprises a polymeric ionic crashing agent selected from the group consisting of polyguanidine, polyethylenimine, polyvinylpyridine, polyvinylamine, polyallylamine, polyacrylamine, polyacrylamide, polyquaternaryamine, cationic polyurethane, aminecellulose, polysaccharide amine, and combinations thereof.

10. The ink system of claim 8, wherein said crashing agent comprises an acidic crashing agent selected from the group consisting of succinic acid, glycolic acid, citric acid, nitric acid, hydrochloric acid, phosphoric acid, sulfuric acid, polyacrylic acid, acetic acid, malonic acid, maleic acid, ascorbic acid, glutaric acid, fumaric acid, tartaric acid, lactic acid, nitrous acid, boric acid, carbonic acid, carboxylic acids such as formic acid, chloroacetic acid, dichloroacetic acid, trichloroacetic acid, fluoroacetic acid, trimethylacetic acid, methoxyacetic acid, mercaptoacetic acid, propionic acid, butyric acid, valeric acid, caproic acid, caprylic acid, capric acid, lauric acid, myristic acid, palmitic acid, stearic acid, oleic acid, rinolic acid, rinoleic acid, cyclohexanecarboxylic acid, phenylacetic; acid, benzoic acid, o-toluic acid, m-toluic acid, p-toluic acid, o-chlorobenzoic acid, m-chlorobenzoic acid, p-chlorobenzoic acid, o-bromobenzoic acid, m-bromobenzoic acid, p-bromobenzoic acid, o-nitrobenzoic acid, m-nitrobenzoic acid, p-nitrobenzoic acid, oxalic acid, adipic acid, phthalic acid, isophthalic acid, terephthalic acid, salicylic acid, p-hydrobenzoic acid, anthranilic acid, m-aminobenzoic acid, p-aminobenzoic acid, benzenesulfonic acid, methylbenzenesulfonic acid, ethylbenzenesulfonic acid, dodecylbenzenesulfonic acid, 5-sulfosalicylic acid, 1-sulfonaphthalene, hexanesulfonic acid, octanesulfonic acid, dodecanesulfonic acid, amino acids such as glycine, alanine, valine, α-aminobutyric acid, α-aminobutryic acid, α-alanine, taurine, serine, α-amino-n-caproic acid, leucine, norleucine, phenylalanine, and combinations thereof.

11. The ink system of claim 8, wherein said crashing agent comprises a multivalent metal salt.

12. A method of printing an inkjet image having a high smear resistance, comprising:

selectively inkjetting an anionic inkjet ink at a desired substrate; and fixing said anionic inkjet ink on said desired substrate with a cationic fixer fluid;

wherein said anionic jettable ink includes between 0.1 and 6% colorant, between 1 and 40% solvent, between 0.3 and 10% latex binder having a particle size between 100 and 300 nm and a glass transition temperature between −20 and +100 degrees Celsius, water, and between 0.1 and 4% hydrophobic styrene-acrylic resin having an acid number between 50 and 250 and a molecular weight between 1,000 and 60,000.

13. The method of claim 12, wherein fixing said anionic inkjet ink on said desired substrate with a cationic fixer comprises overprinting said desired substrate with said cationic fixer.

14. The method of claim 12, wherein fixing said anionic inkjet ink on said desired substrate with a cationic fixer comprises underprinting said desired substrate with said cationic fixer.

15. The method of claim 12, wherein said solvents comprise a combination of 2-pyrrolidinone and 1,2-hexanediol.

16. The method of claim 12, wherein said colorant comprises a self-dispersed pigment.

17. The method of claim 16, wherein said self-dispersed pigment comprises additional styrene-acrylic or acrylic resin attached to said pigment.

18. The method of claim 17, wherein said styrene-acrylic or acrylic resin attached to said pigment has an acid number between 50 and 250 and a molecular weight between 1,000 and 60,000.

19. The method of claim 16, wherein said colorant comprises a polymer-attached pigment wherein said polymer-attached pigment is configured to securely adhere said ink system to a substrate without a cationic fixer fluid.

20. A smear-resistant anionic jettable ink system comprising:

between 0.1 and 6% colorant;

between 1 and 40% solvent;

between 0.3 and 10% latex binder having a particle size between 100 and 300 nm and a glass transition temperature between −20 and +100 degrees Celsius;

water; and between 0.1 and 4% hydrophobic styrene-acrylic resin in soluble form effective to stabilize said latex binder.

* * * * *

UNITED STATES PATENT AND TRADEMARK OFFICE
CERTIFICATE OF CORRECTION

PATENT NO. : 8,114,923 B2
APPLICATION NO. : 11/390778
DATED : February 14, 2012
INVENTOR(S) : George M. Sarkisian et al.

Page 1 of 1

It is certified that error appears in the above-identified patent and that said Letters Patent is hereby corrected as shown below:

In column 14, line 48, in Claim 10, delete "rinolic acid, rinoleic acid," and insert -- ricinoleic acid, --, therefor.

In column 14, line 49, in Claim 10, delete "phenylacetic; acid," and insert -- phenylacetic acid, --, therefor.

In column 14, line 61, in Claim 10, after "acid," delete "α-aminobutryic acid,".

Signed and Sealed this
First Day of January, 2013

David J. Kappos
*Director of the United States Patent and Trademark Office*